United States Patent

[11] 3,537,402

| [72] | Inventor | Andrew J. Harkess<br>Edgewater, New Jersey |
|---|---|---|
| [21] | Appl. No. | 726,781 |
| [22] | Filed | May 6, 1968 |
| [45] | Patented | Nov. 3, 1970 |
| [73] | Assignee | Hewitt-Robins Incorporated<br>Stamford, Connecticut |

[54] DRIVE SYSTEM
5 Claims, 6 Drawing Figs.

[52] U.S. Cl. .................................................. 104/168,
104/89, 104/226
[51] Int. Cl. ..................................................... B61b 13/12,
B65g 23/12
[50] Field of Search .......................................... 104/66, 80,
81, 87, 89, 95, 135, 168, 190, 226; 198/184

[56] References Cited
UNITED STATES PATENTS
| 2,928,525 | 3/1960 | Schaeffer ...................... | 198/165 |
| 3,442,405 | 5/1969 | Schaeffer ...................... | 214/42 |

*Primary Examiner*—Arthur L. La Point
*Assistant Examiner*—Robert Saifer
*Attorney*—John L. Shortley and John D. Boos

ABSTRACT: In the present invention stationary friction drives are located at spaced locations around an overhead track system and over which system vehicles are designed to travel. Each vehicle travelling over the track system is provided with a flexible tension member that is driven by the friction drives. This tension member extends out in front of the vehicle by a distance at least equal to the distance between the two successively spaced friction drives in said track system which are spaced furthest apart. A powered vehicle is coupled to the front of the tension member and serves to extend the tension member from one friction drive to the next in order to allow the friction drives to continuously drive the vehicle.

Patented Nov. 3, 1970

3,537,402

INVENTOR
ANDREW J. HARKESS
BY John L. Boos
ATTORNEY

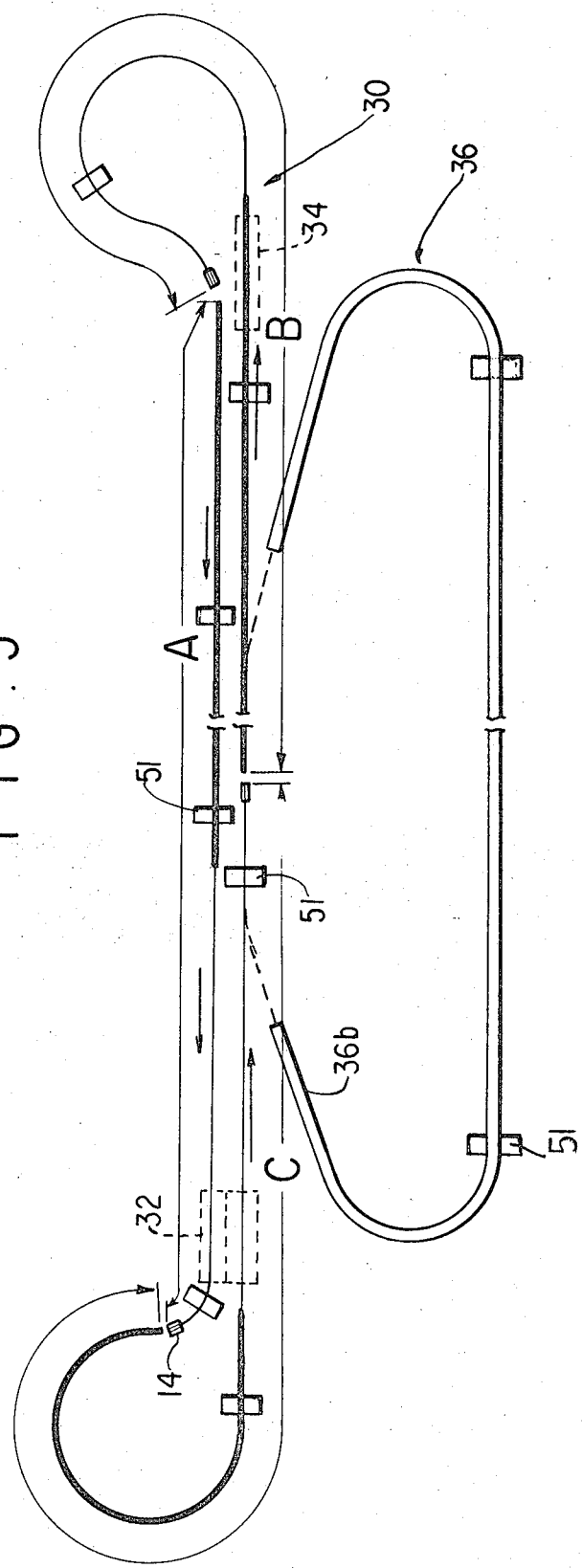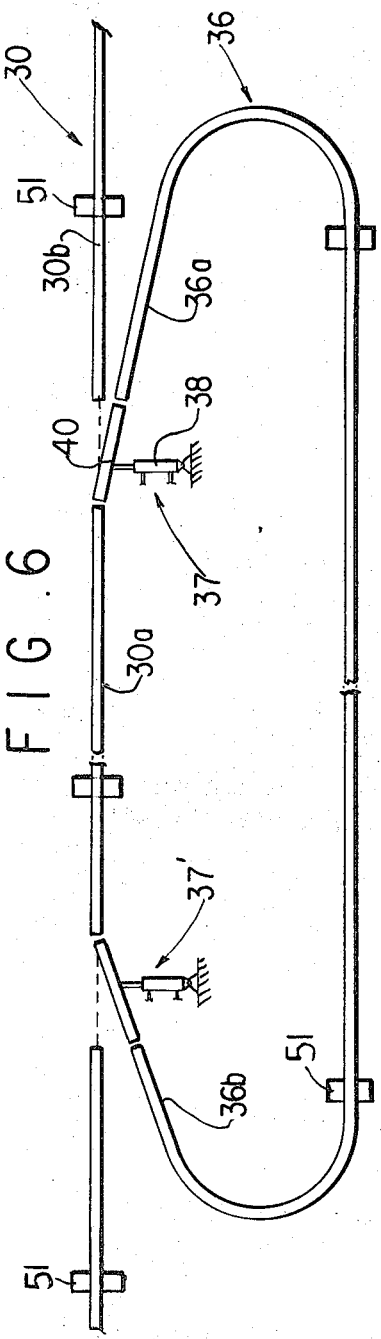

DRIVE SYSTEM

BACKGROUND OF THE INVENTION

The development of belt trains for conveying bulk material has created a need for a new type of drive means which does not create excessive point loads on the rail system and which acts as a conventional locomotive, or power tractor which pulls the belt trains over the rail system. In belt trains a long length of flexible conveyor type belting is suspended from spaced trolleys that ride on the overhead rail system and this belting essentially forms the body or storage portion of the vehicle. The belt is generally formed into a substantially tubular-shaped sleeve or a substantially U shaped trough by having the belt suspended from trolleys by slings which support the underneath portion of the belt and which folds the belt about its longitudinal axis. It will be recognized that vehicles held in this manner can be made extremely long length, for example 300 feet or more, and that the flexibility of this type of vehicle body enables it to snake its way around curves in a manner that would not normally be attainable by a vehicle having a rigid body of comparable length. Thus, the point loads generated by this type of vehicle on the support rails is relatively small in comparison to the total weight of the material conveyed because of the fact that the total weight is distributed over a long distance of track by the spaced supporting trolleys. This type of system can be made at somewhat less cost by virtue of the fact that the support structures and the supporting rails can be specifically designed to carry less point loads than if vehicles having rigid bodies were to be suspended from the rail system. One limiting factor to this potential savings, however, has been that the suspended locomotive or tractor which is necessary to pull this belt train is frequently quite heavy such that the point loads generated by the locomotive is greatly in excess of those generated by the fully loaded flexible belt trains. Thus, it is necessary to provide a drive system which does not generate point loads on the rail system in excess of those normally generated by the fully loaded belt train.

A stationary drive system for endless conveyors has heretofore been suggested in U.S. Pat. application Ser. No. 640,083, now U.S. Pat. No. 3,422,369. This system provides for an independent flexible tension member coupled to the conveyor and the tension member is driven by friction drive assemblies located at spaced distances around the path of the conveyor. Thus, these drive assemblies can be mounted on independent support structures and need not create any load on the rail system which supports the conveyor. It will be recognized, however, that this drive system could not readily be employed for driving belt trains because the belt, which forms the body of the train, is not a structurally rigid, force transmitting member and would therefore tend to collapse as the train was pushed from one friction drive unit to the next. It is necessary that this problem be overcome if this type of drive system is to be adapted for use in driving belt trains.

SUMMARY OF THE INVENTION

In the present invention friction drive means are mounted on support towers at spaced locations around the course of the overhead rail system. These friction drive means are of the type which act upon and drive a tension member that is attached to the vehicle. The tension member in the instant invention is coupled along the entire length of the vehicle and a forward extension of this tension member is extended in front of the vehicle by means of a relatively small light weight tractor which also rides on the rail system. The length of this extension member is at least equal to the greatest distance between any two successively spaced drive means such that the tractor can extend the forward extension of the tension member from one friction drive to the next. In this manner the friction drives of the present invention can continuously drive individual belt trains.

Accordingly, one object of this invention is to provide a drive system for rail supported vehicles.

Another object is to provide a friction drive system for rail suspended belt trains.

Still another object of this invention is to provide a friction drive system for suspended rail supported vehicles wherein the friction drive means operate on a flexible tension member.

A further object is to provide a conveying system employing belt trains in combination with a friction drive system.

DESCRIPTION OF THE DRAWINGS

Other objects, advantages and novel features of the present invention will become apparent in the following more detailed description of the invention when considered in conjunction with the following drawings wherein:

FIG. 5 illustrates schematically a plan view of a belt train system.

FIG. 6 is a plan view of a portion of the suspended rail system showing a conventional switch mechanism which is used in switching the belt train from one track to another.

DESCRIPTION OF THE PREFERRED EMBODIMENT

Figure 1:
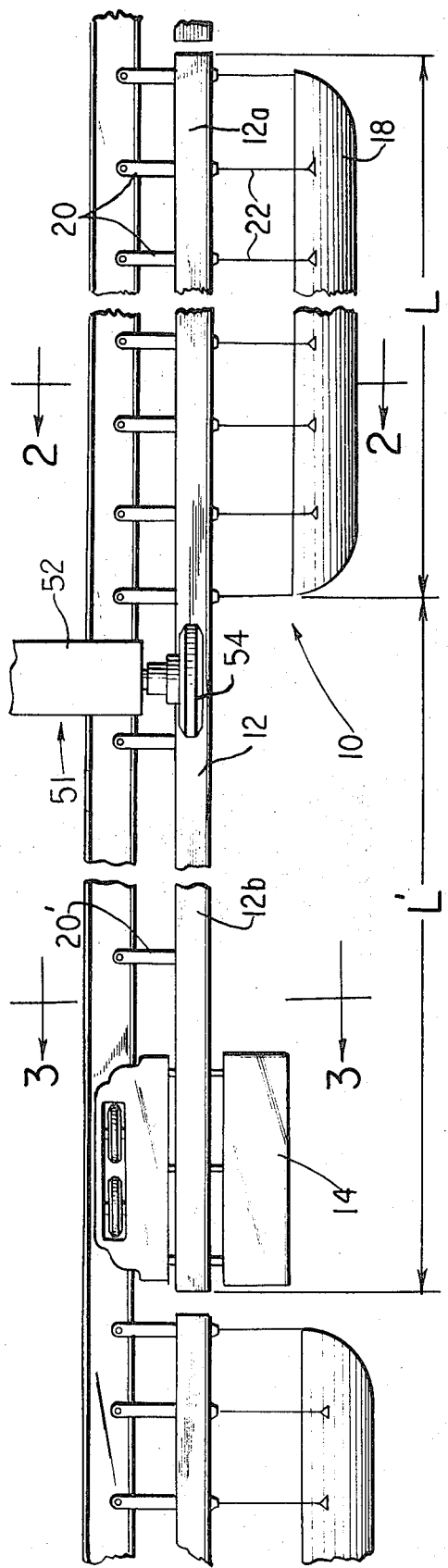
FIG. 1 is a side view of a belt train system, with parts omitted, incorporating the friction drive means of the present invention.
Figure 4:
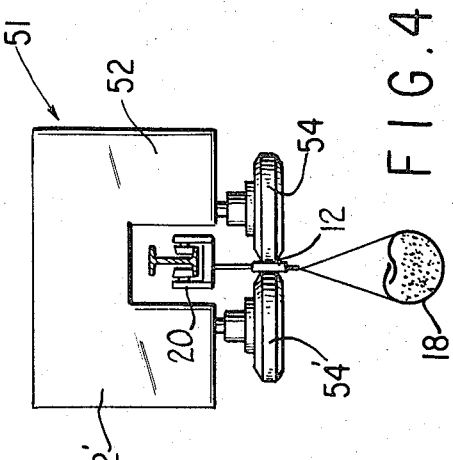
FIG. 4 is a cross-sectional view taken through a belt train suspended from an overhead rail and specifically shows a drive assembly and the rotatable drive members in frictional engagement with the tension member of the belt train.
Figure 2:
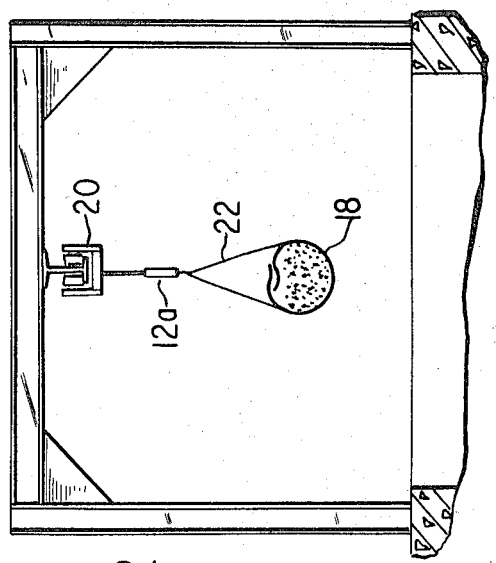
FIG. 2 is a view taken along line 2–2 of FIG. 1.

Referring now to FIG. 1, it will be seen that each belt train 10 has coupled thereto a flexible tension member 12 and that a powered vehicle or locomotive 14 is, in turn, coupled to the front end of the tension member. The body, or storage section of the belt train is formed with a flexible conveyor type belt 18 which is supported from spaced trolleys 20 by cables 22 or equivalent sling means. These trolleys are well known in the art and the type shown has two wheels which are adapted to ride on the lower flanges of the I-beam rails that make up the overhead rail system. The storage section of the train can be made in the form of a tubular sleeve when loaded as shown in FIGS. 2 and 4, or the belt may simply be formed into a long substantially U-shaped trough, not shown, but in any event, the belt is formed into a load carrying section by being folded or shaped around its longitudinal axis. It will be obvious that the tubular type of storage section illustrated in the drawings could have a longitudinal zipper mechanism, which is well known in the art, for keeping the tubular member closed. The opposite longitudinal ends of the belt are closed by being formed upwardly as shown in FIG. 1.

Coupled to the trolleys of the belt train is the tension member 12 which is, for example, cable reinforced belting. The belting is formed on either side of the trolley members so that the friction drive member can contact both sides of the belt as seen in FIG. 4. The flexible tension member has a first or belt train section 12a and a second or forward extension section 12b. The belt train section extends for substantially the entire length L of the belt train and the forward section extends for length L' in front of the belt train section. The length of L' of this forward section is made at least equal the distance between the successive friction drive assemblies in the path of the rail system which are spaced furthest apart. The forward section is suspended from the rail system by spaced trolleys 20' which are similar to the trolleys in the belt train. Coupled to the front end of the forward section of the tension member is a powered vehicle, such as a light weight tractor or locomotive, schematically shown as 14.

Figure 3:
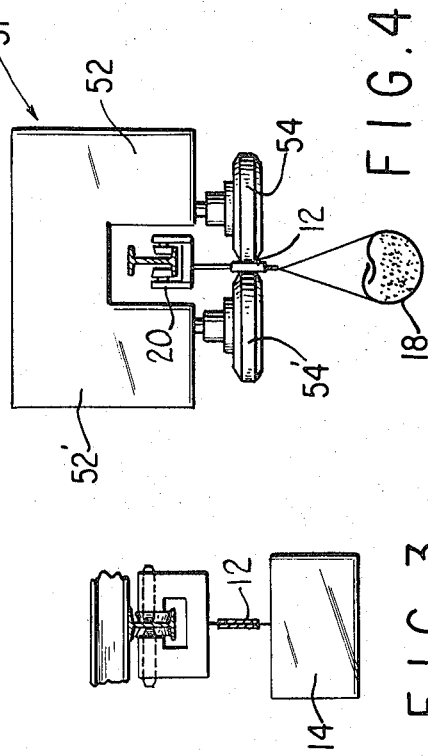
FIG. 3 is a view taken along line 3–3 of FIG. 1.

The locomotive 14, is, as shown in FIG. 3, also suspended from the overhead rail system and may be either of the type having a self-contained power source or may be of the electric type in which an electric contact rail extends around the entire path of travel of the locomotive. In either event, the locomotive merely serves to maintain the forward section of the tension member taut and out in front of the belt train, and in this manner the tension member can be brought into driving engagement with successive drive assemblies. It should be noted that this locomotive does not haul or pull the suspended belt train and that this hauling function is served by the friction drive means which will be described hereinafter.

Referring to FIG. 5, it will be noted that the main system has an overhead closed loop rail system 30 which permits the individual belt train units A, B, C to travel thereover between one or more loading and unloading stations schematically indicated as 32, 34, respectively. This type of station is known in the art and it may be the type shown in U.S. Pat. application Ser. No. 640,083, now U.S. Pat. No. 3,422,369. The belt train units can be switched over from the main track system to a shuttle track 36 in order to permit one of the belt train units to be taken out of the main closed loop rail system without halting the operation of the entire conveying system. The belt trains on this shuttle track can be inspected and repaired or stored until needed.

The switch mechanism 37 is, for example, of the type shown in FIG. 6, wherein a solenoid mechanism 38 or the equivalent type of power means is coupled to a rail section 40 which can be actuated between either of two positions. The first or dashed line position of the switch, as shown in FIG. 6, couples rail section 30a and 30b of the main closed loop system, and when the switch positions the rail 40 in the second position, as shown in FIG. 6, the rail section 30a is coupled to shuttle rail section 36a. A similar switch mechanism 37' is also provided at section 36b of the shuttle track in order to switch the belt train units from the shuttle track back on to the main closed loop rail system.

Located at spaced distances around the rail system are friction drive assemblies 51. In the preferred embodiment of this invention, each friction drive assembly comprises two electrical motor drives 52, 52' which drive rotatable friction wheels 54, 54' respectively. Each drive assembly can be controlled by conventional limit switches so that the assemblies operate only when a tension member is approaching or passing through the assembly. As shown in FIG. 4, the friction drive wheels are mounted in such a manner that they are located on opposite sides of the flexible tension member and frictionally engage this member. An adjustment means, not shown, can also be provided on these drive units so as to vary the amount of normal force with which each of these friction drive wheels contact the tension member.

In order to have these drive assemblies effectively operate on belt trains, it is necessary that, in operation, the tension member constantly exert a pulling force on the front portion of the belt train body section. It is therefore essential that the length L' of the forward section of the tension member be at least equal the distance between the two successive drive assemblies spaced furthest apart in the fixed path defined by the rail system. In this manner there will always be at least one drive assembly pulling the forward section of the tension members and thereby pulling the front section of the belt train. This constant drive action on the forward section of the tension member aids in preventing the forward portion of belt train from collapsing or opening under the forward thrust of the drive assemblies acting on the belt train section of the tension member.

In operation, the tractor maintains the forward section of the tension member taut so as to extend this member out in front of the belt train unit by distance L'. Assuming that the front end of the tension member comes in contact with a friction drive assembly, this assembly then pulls the forward section of the tension member and the attached belt train. At the same time this friction drive is pulling the belt train unit, the tractor continues its travel along the rail system in order to maintain the section in front of the friction drive taut. This operation continues until the tractor has extended the tension member out to, and in driving engagement with, the next succeeding drive assembly. This drive assembly and any other preceeding drive assembly which is in driving engagement with the tension member then combine to pull the belt train. In this manner the stationary friction drive can continually drive the belt train around the fixed path. It will be noted that because of the minimum specified length of forward section of the tension member, there will always be at least one drive assembly in driving engagement with this forward section. This arrangement enables the drive system to always exert a pulling force on the front end of the belt train body and thereby helps to prevent the flexible storage section of the belt train from collapsing, opening, or otherwise being adversely affected by the drive force generated by the drive assemblies acting on the belt train section of the tension member.

From the above disclosure, it will be apparent that the present drive system can be employed for driving any conveyor vehicle and particularly for driving those having flexible storage sections which can be readily bent about the longitudinal axis of the train and which can be readily made to follow a multiple curved snakelike path. It will be obvious that many modifications and variations of the present invention may be practiced otherwise than as specifically described.

I claim:

1. A drive system for driving a conveying vehicle through a fixed path comprising:
   a. drive assemblies located at spaced distances around said path;
   b. a noncontinuous flexible tension member coupled to said conveying vehicle and positioned so as to be engaged and driven by said drive assemblies, said tension member having a first section coupled to said conveying vehicle and a second section extending out in front of said conveying vehicle a distance at least equal to the distance between the two successively spaced drive assemblies in said path which are spaced farthest apart;
   c. means coupled to said tension member for maintaining said second section of said tension member out in front of said vehicle during operation of the drive system where said tension member can be extended out to, and brought into driving engagement with, successive drive assemblies.

2. A drive system described in claim 1 wherein said means comprises a powered vehicle which travels around the same fixed path as said conveying vehicle and which is coupled to the forward section of said tension member.

3. A drive system described in claim 2 wherein said path is defined by a rail system, said conveying vehicle and said powered vehicle being adapted to travel on said rail system.

4. A drive system as described in claim 3 wherein said tension member is a length of reinforced belting and each of said drive assemblies comprises a pair or rotatably driven friction wheels which are adapted to frictionally engage and drive said reinforced belting.

5. The drive system described in claim 4 wherein said conveying vehicle comprises spaced trolleys and a flexible belt-type storage section means suspended from said trolleys, said trolleys being mounted on said rail system for travel therearound, said first section of said tension member being coupled to said trolleys.